United States Patent
Schmidt et al.

(10) Patent No.: US 9,735,917 B2
(45) Date of Patent: Aug. 15, 2017

(54) DIGITAL WIRELESS AUDIO TRANSMISSION SYSTEM AND METHOD FOR WIRELESS AUDIO TRANSMISSION

(75) Inventors: Axel Schmidt, Wedemark (DE); Mathias Kleinsorge, Wedemark (DE); Gerrit Buhe, Wedemark (DE); Björn Wolter, Hannover (DE); Carsten Bischoff, Wedemark (DE)

(73) Assignee: Sennheiser electronic GmbH & CO. KG, Wedemark (DE)

( * ) Notice: Subject to any disclaimer, the term of this patent is extended or adjusted under 35 U.S.C. 154(b) by 120 days.

(21) Appl. No.: 13/390,812

(22) PCT Filed: Aug. 17, 2010

(86) PCT No.: PCT/EP2010/061993
§ 371 (c)(1),
(2), (4) Date: Mar. 15, 2012

(87) PCT Pub. No.: WO2011/020838
PCT Pub. Date: Feb. 24, 2011

(65) Prior Publication Data
US 2012/0177217 A1 Jul. 12, 2012

(30) Foreign Application Priority Data
Aug. 17, 2009 (DE) .................. 10 2009 037 543

(51) Int. Cl.
*H04L 1/00* (2006.01)
*H04L 29/06* (2006.01)
(Continued)

(52) U.S. Cl.
CPC ................ *H04L 1/0001* (2013.01)

(58) Field of Classification Search
USPC ............... 381/80; 455/3.06, 3.01; 370/338
See application file for complete search history.

(56) References Cited

U.S. PATENT DOCUMENTS 4,882,773 A 11/1989 Maloney
8,442,019 B2 * 5/2013 Trott et al. ............. 370/342
(Continued)

FOREIGN PATENT DOCUMENTS

GB          2 427 107     12/2006
WO       WO 01/50669      7/2001
WO     WO 2007/052269     5/2007

OTHER PUBLICATIONS

International Search Report for Application No. PCT/EP2010/061993 dated Dec. 9, 2010.

*Primary Examiner* — Duc Nguyen
*Assistant Examiner* — Yogeshkumar Patel
(74) *Attorney, Agent, or Firm* — Haug Partners LLP

(57) ABSTRACT

An audio transmission system including a wireless digital microphone unit which detects audio signals and wirelessly transmits the detected audio signals based on adjustable transmission settings and transmission parameters, and a central unit. The central unit has a monitor unit for monitoring and analyzing a frequency spectrum of an available frequency band, a link adaptation unit which adapts the microphone's transmission settings and parameters based on the results of the monitor unit, and a transmitting/receiving unit for receiving wirelessly transmitted audio signals from the wireless microphone unit and for transmitting transmission settings and transmission parameters via a return channel to the wireless microphone unit. The microphone's transmission settings and parameters are modified based on the transmission settings and transmission parameters transmitted via the return channel, which have a center frequency of a channel, a selection of a modulation method and parameters thereof, a data rate, and/or a channel encoding.

8 Claims, 3 Drawing Sheets

(51) Int. Cl.
*H04M 1/60* (2006.01)
*H04R 5/04* (2006.01)
*H04B 1/713* (2011.01)

(56) References Cited

U.S. PATENT DOCUMENTS

| | | | |
|---|---|---|---|
| 2005/0113021 A1* | 5/2005 | Gosieski | H04L 29/06027 455/3.06 |
| 2005/0272436 A1* | 12/2005 | Trott et al. | 455/450 |
| 2006/0153155 A1* | 7/2006 | Jacobsen | H04L 1/1829 370/338 |

* cited by examiner

DIGITAL WIRELESS AUDIO TRANSMISSION SYSTEM AND METHOD FOR WIRELESS AUDIO TRANSMISSION

The present application claims priority from PCT Patent Application No. PCT/EP2010/061993 filed on Aug. 17, 2010, which claims priority from German Patent Application No. DE 10 2009 037 543.0 filed on Aug. 17, 2009, the disclosures of which are incorporated herein by reference in their entirety.

BACKGROUND OF THE INVENTION

1. Field of the Invention

The present invention concerns a digital wireless audio transmission system and a method of wireless audio transmission.

2. Description of Related Art

Analog wireless microphone systems are known in which a search is made for free frequency channels for transmission of the audio signals recorded by the microphone units. If a channel is suffering interference then it is possible to use a new undisturbed channel and audio transmission can then occur by way of that new channel.

SUMMARY OF THE INVENTION

An object of the present invention is to provide an improved digital wireless microphone system which can be operated in an environment suffering from interference sources.

Thus there is provided a digital wireless audio transmission system. The system has at least one wireless digital microphone unit for the wireless transmission of audio signals based on adjustable transmission settings and parameters. The audio transmission system further has a central unit which has a monitor unit for monitoring and analyzing a frequency spectrum of an available frequency band, a link adaptation unit for adapting the transmission settings and transmission parameters of the wireless transmission of the microphone unit based on the results of the monitor unit, and at least one transmitting/receiving unit for receiving audio signals to be transmitted wirelessly of the at least one microphone unit and for transmitting transmission settings and transmission parameters by way of a return channel to the microphone unit. The transmission settings and transmission parameters of the wireless transmission of the wireless microphone unit are modified in accordance with the transmission settings and parameters transmitted by way of the return channel. The transmission settings and parameters transmitted by way of the return channel have a center frequency of a channel, a selection of a modulation method and parameters of the modulation method, a data rate and/or channel encoding.

In an aspect of the present invention the microphone unit has a first analysis unit for monitoring and analyzing the frequency spectrum of the available frequency band and a second analysis unit for monitoring and analyzing the wireless transmission from or to the at least one wireless mobile unit. It is thus possible to monitor both the wireless transmission to and from the wireless mobile unit and also the frequency spectrum.

In a further aspect of the invention the link adaptation unit has a modulation selection unit for selection of a modulation method and modulation parameters based on the results ascertained by the monitor unit, a data rate selection unit for selection of a data rate based on the results of the monitor unit, a channel encoder selection unit for selection of a channel encoding based on the results of the monitor unit, an audio encoder selection unit for selection of an audio encoding based on the results of the monitor unit, a channel distribution unit for distribution of the data transmission to various channels based on the results of the monitor unit and a link setting unit for setting the transmission settings and transmission parameters based on the results of the monitor unit.

In a further aspect of the invention the audio transmission system comprises a position information unit having a position determining unit for determining the position of the central unit and a database unit. The database unit has frequency band information associated with the position information. A selection of the available frequency bands can be effected based on the position information.

The invention concerns the notion of providing a digital wireless audio transmission system having at least one wireless microphone and a receiving unit. The receiving unit monitors or detects the transmission parameters and properties of the wireless audio transmission from the microphone units to the receiving units. If one of the parameters or transmission properties falls below a limit value then the receiving unit can initiate adaptation or modification of the wireless digital link or connection. In that way the digital wireless audio transmission system can be automatically adjusted to new ambient situations.

As an alternative to the wireless microphone it is also possible to provide a wireless pocket transmitter or an in-ear monitor unit in the audio transmission system.

Further configurations of the invention are subject-matter of the appendant claims.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
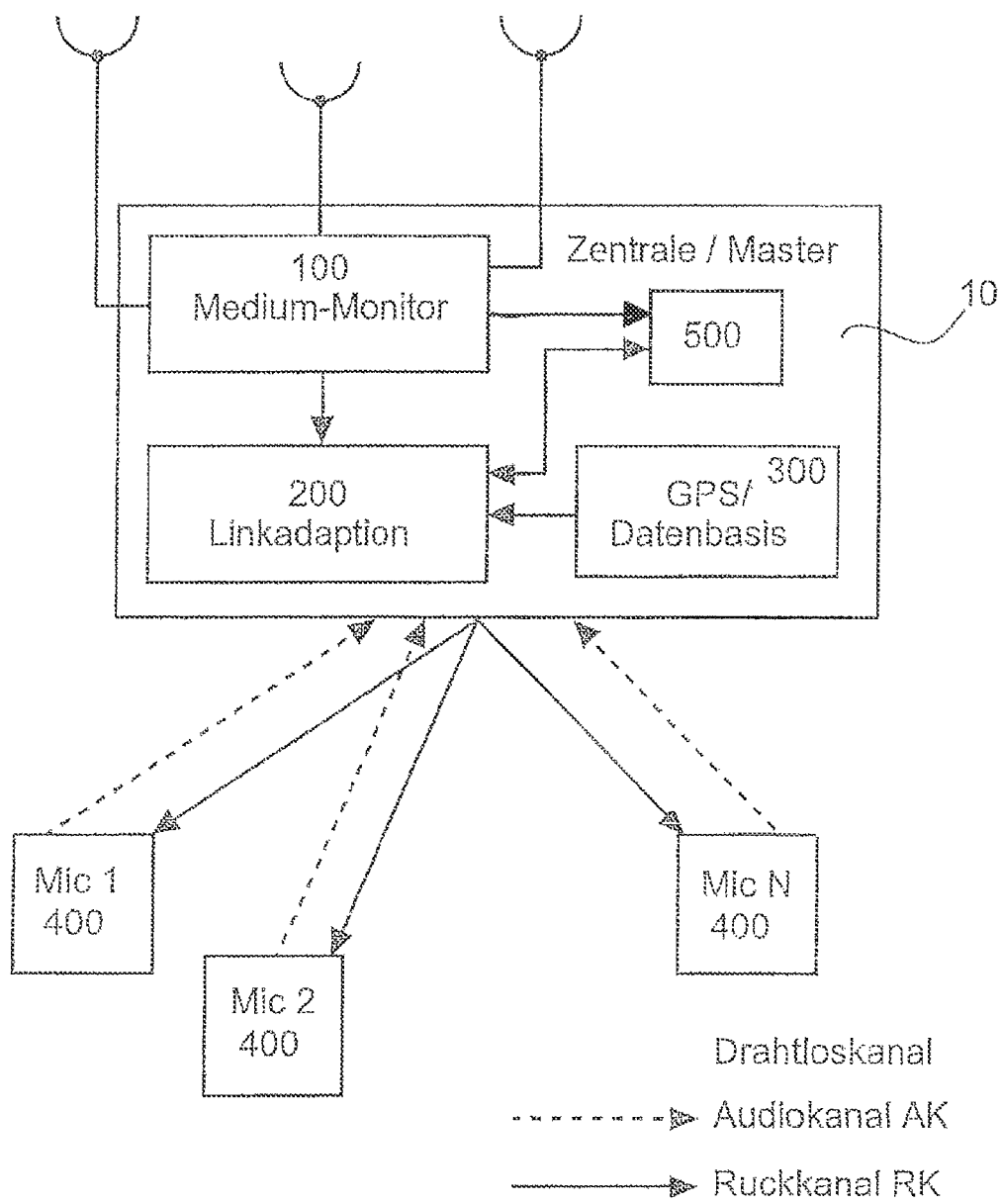
FIG. 1 shows a diagrammatic view of a digital wireless microphone system according to a first embodiment.

FIG. 1 shows a diagrammatic view of a digital wireless audio transmission system according to the first embodiment. In this case the audio transmission system is in the form of a wireless microphone system. The digital wireless microphone system has a central unit 10 and a plurality of mobile units in the form of wireless microphone units 400. The wireless microphone units 400 record or detect audio signals and implement digital wireless audio transmission to the central unit 10. That is effected by the wireless channel AK (for example an HF channel). In addition provided between the central unit 10 and the microphone units 400 is a respective return channel RK, by way of which items of control information or an instruction for modification of transmission parameters can be transmitted from the central unit 10 to the microphone units 400.

The central unit 10 has a monitor unit 100 for monitoring the digital wireless transmitting/receiving environment, a link adaptation unit 200 for adapting the wireless link, a wireless transmitting/receiving unit 500 and optionally a position information unit 300.

The monitor unit 100 serves to implement analysis of the environment of the central unit for example in respect of frequency occupancy, the presence of interference sources in a frequency band, the bandwidth of the available channels and the like. The monitor unit 100 can also be adapted to perform an analysis of the received signals from the microphone units 400 as well as the parameters or settings of the audio transmission from the microphone units 400.

The link adaptation unit 200 serves, in dependence on the items of information detected by the monitor unit 100 to possibly perform adaptation of the transmission channel or the parameters or settings of the transmission from the wireless microphone units. The transmitting/receiving unit 500 serves to receive the audio signals transmitted from the microphone units 400. The transmitting/receiving unit also has a return channel transmitting unit for the transmission of items of information (transmission settings and transmission parameters) from the central unit 10 to the respective microphone units 400 by way of a return channel.

Optionally the position information unit 300 can perform a position determining operation and can pass onward items of information in respect of the instantaneous position of the link adaptation unit 200.

The monitor unit 100 detects the parameters of a frequency spectrum within a frequency band available for wireless digital audio transmission. In that respect it is possible to detect suitable frequency channels and interference sources within the frequency band. In dependence on those detected items of information, a modification to the transmission settings or parameters of the digital wireless transmission between the wireless microphone units and the central unit 100 can be performed in the link adaptation unit 200. In that case for example the modulation method, the stepping configuration of the modulation method, the data rate, the channel encoding, the audio encoding and/or the channel occupancy can be influenced or adapted.

Figure 2:
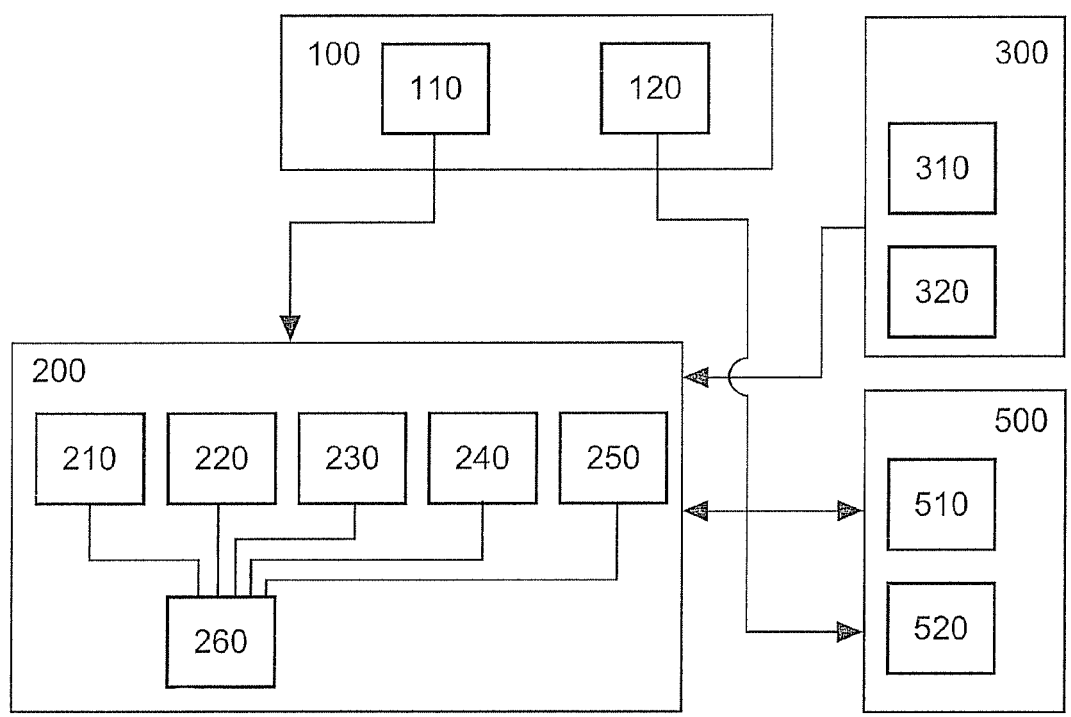
FIG. 2 shows a detained diagrammatic view of a central unit of the wireless microphone system of FIG. 1.

FIG. 2 shows a detained diagrammatic view of the central unit 10 in accordance with a second embodiment. In this case the central unit 10 in accordance with the second embodiment can be based on the central unit 10 in accordance with the first embodiment.

The central unit 10 has a monitor unit 100, a link adaptation unit 200, a transmitting/receiving unit 500 and optionally a position information unit 300. The monitor unit 100 has a first analysis unit 110 for analysis of the frequency environment and a second analysis unit 120 for analysis of the audio signals transmitted from the microphone units 400. In the first analysis unit 110, the quality of the available frequency spectrum in the allowed frequency band can be monitored and analyzed. In that case for example the available frequency channels inclusive of the bandwidth thereof can he determined. In addition the interference sources in the frequency band can be detected. That analysis of the frequency spectrum can be effected continuously or at predetermined moments in time. The wireless microphone system can be brought into coincidence with modifications in the frequency spectrum by continuous analysis of the latter.

The link adaptation unit 200 can have a modulation selection unit 210, a data rate selection unit 220, a channel encoder selection unit 230, an audio encoder selection circuit 240, a channel distribution unit 250 and a link setting unit 260. The modulation selection unit 210 serves in that case to make a selection of the modulation method based on the results of the monitor unit 110. In that respect it is possible to use various modulation methods such as for example single-carrier or multi-carrier methods, FSK, MSK, PSK or the like. In addition the number and spacing of the subcarriers in the case of multi-carrier modulation methods can be adjusted. Furthermore the stepping nature of a modulation method such as for example 64 QAM, 16 QAM can be adjusted. In that case the selection of the modulation method is effected in dependence on the results of the first analysis unit 110.

The data rate selection unit 220 serves for selection of a data rate for the wireless transmission in dependence on the results of the first analysis unit 110. The channel encoder selection unit 230 serves for the selection of channel encoding in dependence on the results of the first analysis unit 110. The audio encoder selection unit 240 serves for the selection of audio encoding for the wireless transmission in dependence on the results of the first analysis unit 110. The channel distribution unit 250 serves for the distribution of available channels in the case of digital wireless audio transmission in dependence on the results of the first analysis unit 110. The link setting unit 260 serves for setting the parameters of the link for the digital wireless audio transmission in dependence on the selection of the modulation selection unit 210, data rate selection unit 210, channel encoder selection unit 230, audio encoder selection unit 240 and channel distribution unit 250. The settings and parameters set by the link setting unit 260 can then be transmitted by means of the transmitting/receiving unit 500 to the wireless microphone units 400 which then perform their wireless audio transmission in corresponding fashion.

The transmitting/receiving unit 500 has a wireless receiving unit 510 for receiving the audio signals transmitted from the wireless microphone units and a return channel transmitting unit 520 for transmitting settings and parameters for a change in the transmission parameters.

Optionally there can be a position information unit 300. The position information unit 300 can have a position determining unit (GPS) 310 and database 320. The database 320 has items of information in respect of the available frequency bands in relation to the respective positions. Those items of information can then be used by the link adaptation unit 200 to select frequencies only within the permitted frequency band.

The quality of the frequency spectrum and the appropriate frequency channels can be continuously and dynamically monitored in the monitor unit 100. Monitoring of the currently prevailing link quality can also be effected. If the currently prevailing link quality falls below a fixed limit value adaptation of the wireless transmission link can then be effected. In that case the link adaptation unit 200 determines which of the parameters and settings of the wireless audio transmission have to be modified so that the link quality is above a previously established limit value. The items of information in respect of a modification to the transmission link can be communicated to the wireless microphone units 400 for example by the return channel transmitting unit 520. That can be effected for example on the basis of dedicated log-in and log-out frames.

Various methods of adapting the transmission link can be combined in the link adaptation unit 200. If for example there are a plurality of frequency channels with slight interference so that it is no longer possible to communicate in error-free fashion with a higher-value kind of modulation such as for example 16 QAM, then the data can be distributed for example to two different frequency channels and transmitted in error-free fashion with a lower modulation stepping (for example QPSK). The data from the two channels can then be suitably brought together in the central unit 10.

If for example there are a plurality of interference-affected channels then transmission can be effected by way of all interference-affected channels. An intelligent combination of all data transmitted by way of the interference-affected. channels can then be effected in the central unit. It is possible in that way to achieve an improved signal-to-noise ratio, whereby higher-grade modulation is possible.

If however the signal-to-noise ratio falls then an adapted audio encoding can be effected with a reduced channel data rate to permit robust transmission. Robust transmission can then permit error-free transmission with a higher level of audio compression. Optionally it is also possible to accept lossy encoding of the audio signals if sufficient transmission capacities are not present.

If for example there is a channel without interference then wireless audio transmission from the microphone units to the central unit can be at least temporarily implemented by way of that undisturbed channel.

The monitor unit 100 can also be adapted to perform a quality-of-service QoS identification. A quality-of-service setting can be associated with each microphone unit so that the various microphone units can be associated with differing prioritization. Thus for example the microphone for a lead singer can have or be attributed with a higher quality-of-service setting than the microphones for example for background singers. In that way the audio signals from the microphone of the lead singer are transmitted with a higher level of prioritization than for example audio signals from other singers.

The return channel RK can be used for example robustly and on a world-wide basis (for example in the ISM band).

When for example it is found that a signal-to-noise ratio is below a limit value on a given channel so that it is no longer possible to embody a higher data rate, it is possible by means of the wireless digital microphone system according to the invention to switch over the stepping of the modulation method for example from 64 QAM to 16 QAM. In that way the data rate is reduced to 25%. If however for example on the basis of the first analysis unit 110 it has been found that one or more data channels is or are available, then the data stream can be distributed to the two data channels, in which case the transmission parameters or settings on the two channels can be different.

The selected setting parameters are also transmitted in the audio transmission. so that the separate data streams can be brought together again in the central unit 10.

Different setting parameters, modulation methods, steps of the modulation method, data rate, channel encoding and/or audio encoding can be selected on the selected channels. In other words, transmission on one channel can be different from transmission on another channel. It is important in that respect that optimum setting of the parameters is implemented for each channel.

Preferably the selection of the channels and the selection of the transmission parameters is effected by the central unit 10, in particular by the link adaptation unit 200 based on the results of the first analysis unit 110.

Preferably the center frequency or medium frequency of the transmission, the data rate and the channel encoding as well as the modulation method are transmitted to the wireless microphone units by way of the return channel by means of the return channel transmitting unit 520 so that they can be set to those setting parameters and can suitably perform wireless digital transmission.

The first analysis unit 110 is adapted to check the occupancy of the various frequency channels in the available frequency band. That can also include detection of the bandwidths of the various channels.

The second analysis unit 120 is adapted to detect and evaluate the signals from the respective wireless microphone units 400. That can involve for example detection of the signal-to-noise ratio. In addition further parameters or settings of the audio transmission can be detected. It is possible in that respect for example also to monitor whether the respective microphone units 400 have been set to the predetermined center frequencies, modulation method, data rate, channel encoding, audio encoding or the like, which have been predetermined by the link adaptation unit 200. Accordingly it is possible to provide for monitoring of the presets. A microphone unit can display whether it has implemented the required adjustments, by means of the log-off and log-on frames.

In a configuration of the present invention the audio signals to be transmitted from the wireless microphone units can be distributed to a channel or a plurality of channels. Transmission by way of the respective channels can then be suitably controlled by the link adaptation unit 200, in which case the parameters and settings of the transmission by way of the respective channels are adapted to the circumstances of the respective channels.

Upon distribution of the data to different channels for example the data rate on the respective channels can be reduced. The reduced data rate then depends on the number of channels. As an alternative thereto the same data can be transmitted by way of a plurality of channels. The data received by way of the various data channels can be intelligently brought together in the central unit 10. In that way it is possible to guarantee a transmission even if the respective data channels are faulty. Error-free data reception can be first ensured by the data received by way of the various data channels being intelligently brought together.

Although FIG. 1 only shows one transmitting/receiving unit there can be a plurality of transmitting/receiving units 500. Those receiving units can be part of the central unit 10 or can be connected to or coupled to the central unit 10. For example there can be a dedicated return channel for each transmitting/receiving unit.

In a second embodiment of the invention implementation of the changes to the transmission settings and parameters can be carried out in the microphone unit itself. With a falling link quality the microphone can re-set the settings and link parameters, based on the results of the monitor unit which are transmitted to the microphone by way of the return channel. That can then be communicated to the receiving unit so that it can make suitable adjustments.

In a third embodiment which can be based on the first or second embodiment there can be a wireless digital pocket transmitter, in addition to or alternatively to the wireless microphone units. The wireless pocket transmitter can receive audio signals by way of a further microphone and can then transmit them to the central unit. Thus there can be provided an audio transmission system in which there are provided wireless microphone units and/or wireless pocket transmitters.

In the foregoing embodiments, reference was made to a microphone unit. The foregoing embodiments however also apply to a pocket transmitter at which there is no microphone but which receives an audio signal at its input.

In a fourth embodiment which can be based on the first, second or third embodiment there is a wireless digital in-ear monitor unit as a mobile unit. The wireless in-ear monitor unit receives audio signals from a central unit 10 and can output those audio signals to the user for example by way of an earpiece. In the fourth embodiment there is also a return channel between the mobile wireless in-ear monitor units and the central unit. In that respect the design configuration and control of the return channel can optionally correspond to the design configuration and control of the return channel in accordance with the first, second or third embodiment. Alternatively thereto the design configuration and control of the return channel can be provided in such a way that the return channel is only used to implement a handshake mechanism. In that way the in-ear monitor unit would only confirm for example a change to the frequency by way of the return channel.

As an alternative to the above-described embodiments there can be a central unit or a central device connected to the central units or the transmitting/receiving units. That central device can centrally predetermine the settings or parameters of the wireless audio transmission. That can also be implemented for example by a plurality of transmitting/receiving units 500 being provided in the central unit or connected to the central unit.

In contrast thereto in an autonomous approach adjustment of the transmission settings and parameters can be effected separately for each transmission section. In such a situation the microphone unit or pocket transmitter can itself perform the modification of the transmission settings or transmission parameters for the separate transmission section.

In a further embodiment of the invention a number of transmitting/receiving units can be connected to the central unit and controlled by way of the central unit. In that case there can be a transmitting/receiving unit both for reception of the wireless audio transmission and also for the return channel. Preferably there is a transmitting/receiving unit for each microphone unit or each pocket transmitter.

Figure 3:
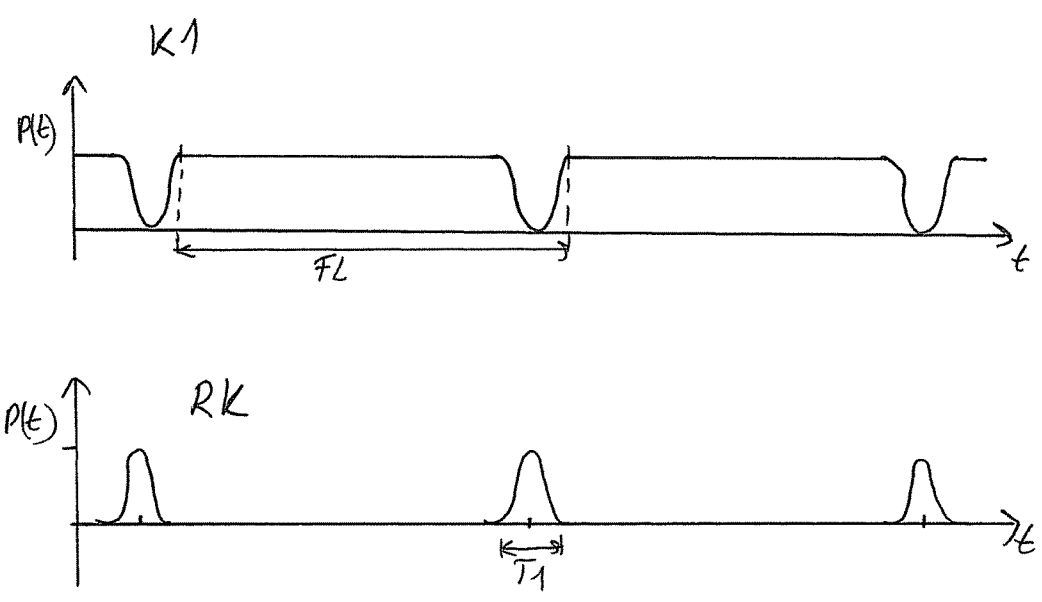
FIG. 3 shows a view of the transmission in the case of a wireless digital audio transmission system according to a fifth embodiment.

FIG. 3 shows a view of the transmission in a wireless digital audio transmission system according to a fifth embodiment. The audio transmission system according to the sixth embodiment can be based on an audio transmission system according to the first, second, third or fourth embodiment. Thus wireless transmission is accordingly effected between the central unit 10 and a mobile unit 400. That transmission can be directed from the mobile unit to the central unit if the mobile unit is in the form of a microphone unit or pocket transmitter. If the mobile unit is in the form of an in-ear monitor unit or camera receiver then wireless transmission can be from the central unit to the mobile unit. The respective return channel is provided in the microphone units or wireless pocket transmitters from the central unit to the mobile units. In the case of the in-ear monitor units the return channel is then provided from the in-ear monitor to the central unit. Alternatively thereto there can be a further return channel from the central unit to the in-ear monitors.

FIG. 3 shows a view in respect of time of the transmitting power of a channel K1 and a view in respect of time of the transmitting power of the return channel RK. In that case the channel K1 can be implemented both from the mobile units to the central unit and also from the central unit to the mobile units.

While the main channel K1 is adapted for transmission of the useful signal (audio signal) from the mobile units to the central unit 10 (the mobile units are in the form of wireless microphone units or wireless pocket transmitters), the return channel is from the central unit to the mobile units. In the fifth embodiment of the invention transmission is effected on the return channel at the same frequency as on the first channel. So that the situation does not involve interference phenomena on that transmission channel the transmission on the first channel K1 is reduced for a short time or the power P(t) in the first channel is reduced. In return the power at the same moment in time in the return channel RK is increased for the transmission for example from the central unit to the mobile units. Thus transmission is effected by way of the return channel precisely at the time intervals when the transmission by way of the first channel K1 is reduced or suspended.

The return channel or the return section can serve to transmit parameters of the transmission to the mobile units, that is to say the wireless microphone or the wireless transmitter so that they can be correspondingly modified in the mobile unit. Those parameters can involve synchronization, adaptation of audio amplification, adaptation of the transmitting power, a modulation mode and the source and channel encoding. Accordingly a modification to the parameters of the mobile unit is to be made possible by means of the wireless return section or wireless return channel. Those parameters can involve the time basis (synchronization), audio amplification and parameters for wireless transmission such as for example transmitting power, modulation method and source and channel encoding. The provision of the return channel is intended to improve the reliability of wireless transmission between the mobile units and the central unit by enhancing the reliability of transmission with changing ambient conditions (radio channel, interference phenomena etc.).

In fifth embodiment transmission is effected on the return section or return channel at the same frequency as on the main channel K1, between the mobile unit and the central unit. Wireless transmission by way of the main channel can be effected both from the mobile unit to the central unit and also from the central unit to the mobile unit. To permit wireless transmission by way of the main channel and also by way of the return channel at the same frequency transmission can be effected in the time division duplex mode. That involves fixing a frame in which wireless transmission is effected by way of the main channel to transmit the useful data (audio signals). The mobile unit can alternately transmit and receive at the same frequency. That is advantageous as an HF synthesizer can be operated continuously.

The frame lengths in transmission by way of the main channel and in transmission by way of the return channel are of different values and can be determined by the minimum latency of the main channel. The ratio of the time slots for the main channel and the return channel can correspond to the ratio of the symbol rates for the main channel and the return channel. In that respect the symbol rate on the main channel is substantially greater than that on the return channel. The data rates on the main channel and the return channel then correspond to a multiplication of the symbol rates by the number of bits/symbol of the respective modulation mode.

The robustness of the return channel can be increased in relation to the main channel by a selection of the appropriate kind of modulation. In addition a receiver which is required in the mobile unit can be of a simpler design configuration by virtue of a suitable selection of the kind of modulation of wireless transmission with the main channel.

Optionally the reduction in the power on the main channel or the increase in power on the return channel can be effected not abruptly but continuously (as shown in FIG. 3). The reduction in power on the main channel and the increase in power on the return channel can be effected in that case in accordance with a cosine-square function. That is advantageous because such a reduction or increase in power can be provided directly in a digital modulator in a transmitter. In particular the transmitting final stage can be completely switched off for the main channel if there is a very low HF level.

If the mobile unit is in the form of a wireless radio microphone the main channel with the audio data section can have a transmitting time of 3 ms and transmission can then be effected with 32 QAM modulation (corresponds to 5 bits/symbol). The return channel or return section can have a transmitting time of 100 µs and can have robust BPSK modulation (corresponds to 1 bit/symbol). The increase and decrease in transmitting power in the main channel and the return channel can take place every 20 µs so that the switching spectrum does not violate the frequency mask. The symbol duration can be of 66 µs, which corresponds to 166.7 ksps in both directions. Accordingly the situation involves a data rate on the main channel (audio data section) of (3 ms−2·20 µs)/6 µs·5 bit/3.1 ms=796 kbit/s. The return section has a data transmission of (100 µs−2·20 µs)/6 µs·1 bit/3.1 ms =3.2 kbit/s. The central unit in the form of a stationary receiver can be synchronized to the transmitted frames of the mobile unit and can thus predict coming uplink time slots and use them for the transmission of signaling data by way of the return channel back to the mobile unit. Updating of frame synchronization can be effected on the basis of the recovered symbol clock. Additionally or alternatively observation of the power ramping which initiates or terminates active time slots can be observed. Signaling or transmission from the mobile unit to the central unit which in the form of a stationary receiver can be effected embedded in the audio data stream. Flow control or handshaking can also be implemented on the basis of the return section or return channel provided in accordance with the embodiments of the invention.

If the mobile unit is in the form of an in-ear monitor unit then optionally there can be a return channel from the central unit to the in-ear monitor unit in the same transmission direction as the main transmission (audio data section).

Remote control of the mobile units can be effected by the provision of the return channel or return section according to the invention. That is advantageous in regard to an improvement in reliability and an improvement in frequency efficiency in wireless audio transmission systems. Asymmetrical time division duplex transmission is proposed in accordance with the fifth embodiment. In this case, the same frequency is used for the return channel as in the main channel. Thus no additional frequency resources are required. The frequency for the wireless transmission means that automatic addressing or distinguishing of the respective transmitters and receivers can also be effected. No additional synthesizer is required in the mobile units as transmission takes place at the same frequency. In addition there is no need for a second radio solution so that there is also a broader space requirement. Furthermore the coexistence problems as between different radio solutions can be avoided in accordance with the invention. In addition the energy consumption in mobile units can be reduced as no further transmitter/receiver is needed. Furthermore it is possible to dispense with an additional antenna in the mobile unit. The channel estimation for the main channel can also be used for the return channel. A frequency change for the avoidance of interference can be initiated in an uplink time slot so that there does not have to be any audio interruption. Scalability of the uplink and downlink data rate can be made possible for different applications by a compromise in respect of latency.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A digital wireless audio transmission system comprising:
   at least two wireless digital microphone units for the detection of audio signals and for the wireless radio transmission of the detected audio signals based on adjustable radio transmission settings and transmission parameters;
   a central unit which includes:
      a monitor unit including:
         a first analysis unit for monitoring and analyzing a frequency spectrum of an available frequency band; and
         a second analysis unit for continuously monitoring and analyzing the wireless radio transmission from the at least two wireless microphone units and for performing a quality-of service identification for the radio transmission from the at least two wireless microphone units;
      a link adaptation unit for adapting the radio transmission settings and transmission parameters of the wireless radio transmission of each microphone unit based on the results of the first and the second analysis units of the monitor unit; and
   at least one transmitting/receiving unit for receiving wirelessly transmitted audio signals from the wireless microphone units and for transmitting radio transmission settings and transmission parameters by way of a return channel to the wireless microphone units;
   wherein the radio transmission settings and transmission parameters of the wireless radio transmission of each wireless microphone unit are modified in accordance with the radio transmission settings and transmission parameters transmitted by way of the return channel;
   wherein the radio transmission settings and transmission parameters transmitted by way of the return channel include at least one of:
      a center frequency of a radio channel;
      a selection of a modulation method and parameters of the modulation method;
      a data rate; and
      a channel encoding;
   wherein a quality-of-service setting is associated to each microphone unit to associate the at least two microphone units with differing prioritization, such that a higher priority microphone is attributed with a higher quality-of-service setting; and wherein the link adaptation unit is configured to adapt the radio transmission settings if the quality-of-service indication falls below a limit value.

2. The wireless audio transmission system as set forth in claim 1;
wherein the link adaptation unit includes:
a modulation selection unit for selecting a modulation method and modulation parameters based on the results ascertained by the monitor unit;
a data rate selection unit for selecting a data rate based on the results of the monitor unit;
a channel encoder selection unit for selecting a channel encoding based on the results of the monitor unit;
an audio encoder selection unit for selecting an audio encoding based on the results of the monitor unit;
a channel distribution unit for distributing the data transmission to various channels based on the results of the monitor unit; and
a link setting unit for setting the radio transmission settings and transmission parameters based on the results of the monitor unit.

3. The wireless audio transmission system as set forth in claim 1, further comprising:
a position information unit including: a position determining unit for determining the position of the central unit; and
a database unit;
wherein the database unit has frequency band information associated with the position information; wherein a selection of the available frequency bands is configured to be effected based on the position information.

4. The wireless audio transmission system as set forth in claim 1;
wherein the frequency of the transmission onto the return channel corresponds to the frequency of the wireless transmission between each microphone unit and the central unit;
wherein the transmission is effected in a time division duplex mode; and
wherein a transmission onto the return passage is effected when sending is not effected on the main channel.

5. A digital wireless audio transmission method comprising:
wirelessly radio transmitting audio signals, based on adjustable radio transmission settings and/or parameters, via a wireless digital microphone unit or via a digital wireless pocket transmitter;
monitoring and analyzing a frequency spectrum of an available frequency band;
continuously monitoring and analyzing the wireless radio transmission from the wireless microphone unit or the pocket transmitter;
performing a quality-of-service identification for the radio transmission;
adapting the radio transmission settings and/or parameters of the wireless transmission of the microphone unit or the pocket transmitter based on the results of the monitoring and analyzing of the frequency spectrum and the quality-of-service identification;
at least one of:
receiving wirelessly transmitted audio signals from the microphone unit or the pocket transmitter; and
wirelessly sending audio signals to the microphone unit or the pocket transmitter; and
modifying the radio transmission settings and/or parameters of the microphone unit or the pocket transmitter in accordance with radio transmission settings and transmission parameters transmitted by way of a return passage;
wherein the radio transmission settings and transmission parameters transmitted by way of the return channel include at least one of:
a center frequency of a channel;
a selection of a modulation method and parameters of the modulation method;
a data rate; and
a channel encoding; and
wherein the radio transmission settings are adapted if the quality-of-service indication falls below a limit value.

6. A digital wireless audio transmission system, comprising:
at least two wireless digital pocket transmitters for receiving audio signals and for wirelessly radio transmitting the received audio signals based on adjustable radio transmission settings and transmission parameters;
a central unit which has:
a monitor unit including
a first analysis unit for monitoring and analyzing a frequency spectrum of an available frequency band ; and
a second analysis unit for continuously monitoring and analyzing the wireless radio transmission from the at least two wireless digital pocket transmitters and for performing a quality-of-service identification for the radio transmission from the at least two wireless digital pocket transmitters;
a link adaptation unit for adapting the radio transmission settings and transmission parameters of the wireless transmission of the pocket transmitters based on the results of the first and the second analysis units of the monitor unit; and
at least one transmitting/receiving unit for receiving wirelessly transmitted audio signals from the wireless pocket transmitters and for transmitting radio transmission settings and transmission parameters by way of a return channel to the wireless pocket transmitters;
wherein the radio transmission settings and transmission parameters of the wireless transmission of each wireless pocket transmitter are modified in accordance with the radio transmission settings and transmission parameters transmitted by way of the return channel;
wherein the radio transmission settings and transmission parameters transmitted by way of the return channel include:
a center frequency of a channel;
a selection of a modulation method and parameters of the modulation method;
a data rate; and
a channel encoding;
wherein a quality-of-service setting is associated to each pocket transmitter to associate the at least two pocket transmitters with differing prioritization, such that a higher priority pocket transmitter is attributed with a higher quality-of-service setting; and
wherein the link adaptation unit is configured to adapt the radio transmission settings if the quality-of-service indication falls below a limit value.

7. A digital wireless audio transmission system comprising:
at least one wireless digital microphone unit for detecting audio signals and for wirelessly radio transmitting the detected audio signals based on adjustable radio transmission settings and transmission parameters;
a central unit which has:
  a monitor unit including:
    a first analysis unit for monitoring and analyzing a frequency spectrum of an available frequency band; and
    a second analysis unit for continuously monitoring and analyzing the wireless radio transmission from the wireless microphone unit for performing a quality-of-service identification for the radio transmission from the wireless microphone unit;
  a link adaptation unit for adapting the radio transmission settings and transmission parameters of the wireless transmission of the microphone unit based on the results of the first and the second analysis units of the monitor unit; and
  at least one transmitting/receiving unit for receiving wirelessly transmitted audio signals from the wireless digital microphone unit and for transmitting radio transmission settings and transmission parameters by way of a return channel to the wireless digital microphone unit;
wherein the radio transmission settings and transmission parameters of the wireless transmission of the wireless digital microphone unit are modified in accordance with the radio transmission settings and transmission parameters transmitted by way of the return channel;
wherein the radio transmission settings and transmission parameters transmitted by way of the return channel include at least one of:
  a center frequency of a channel;
  a selection of a modulation method and parameters of the modulation method;
  a data rate; and
  a channel encoding; and
wherein the link adaptation unit is configured to adapt the radio transmission settings if the quality-of-service indication falls below a limit value.

8. A digital wireless audio transmission system, comprising:
  at least one wireless digital pocket transmitter for receiving audio signals and for wirelessly radio transmitting the received audio signals based on adjustable radio transmission settings and transmission parameters;
  a central unit which includes:
    a monitor unit including;
      a first analysis unit for monitoring and analyzing a frequency spectrum of an available frequency band; and
      a second analysis unit for continuously monitoring and analyzing the wireless radio transmission from the wireless digital pocket transmitter for performing a quality-of-service identification for the radio transmission from the wireless digital pocket transmitter;
    a link adaptation unit for adapting radio transmission settings and transmission parameters of the wireless transmission of the pocket transmitter based on the results of the first and the second analysis units of the monitor unit; and
    at least one transmitting/receiving unit for receiving wirelessly transmitted audio signals from the wireless digital pocket transmitter and for transmitting radio transmission settings and transmission parameters by way of a return channel to the wireless digital pocket transmitter;
  wherein the radio transmission settings and transmission parameters of the wireless transmission of the wireless pocket transmitter are modified in accordance with the radio transmission settings and transmission parameters transmitted by way of the return channel;
  wherein the radio transmission settings and transmission parameters transmitted by way of the return channel include at least one of:
    a center frequency of a channel;
    a selection of a modulation method and parameters of the modulation method;
    a data rate; and
    a channel encoding; and
  wherein the link adaptation unit is configured to adapt the radio transmission settings if the quality-of-service indication falls below a limit value.

* * * * *